Sept. 12, 1961      I. M. LEVY      2,999,954
TWO-SPEED FOUR-SIX POLE STATOR WINDING ARRANGEMENT
Filed Sept. 29, 1959      2 Sheets-Sheet 1
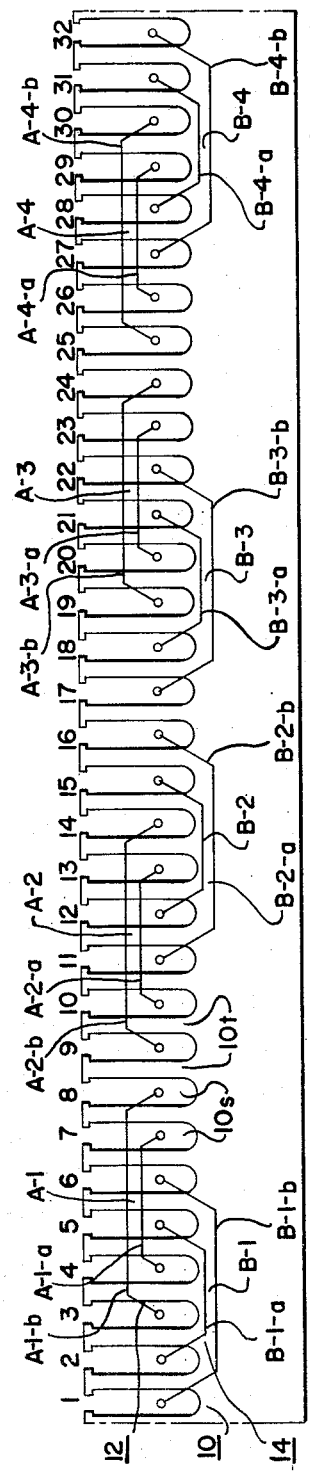
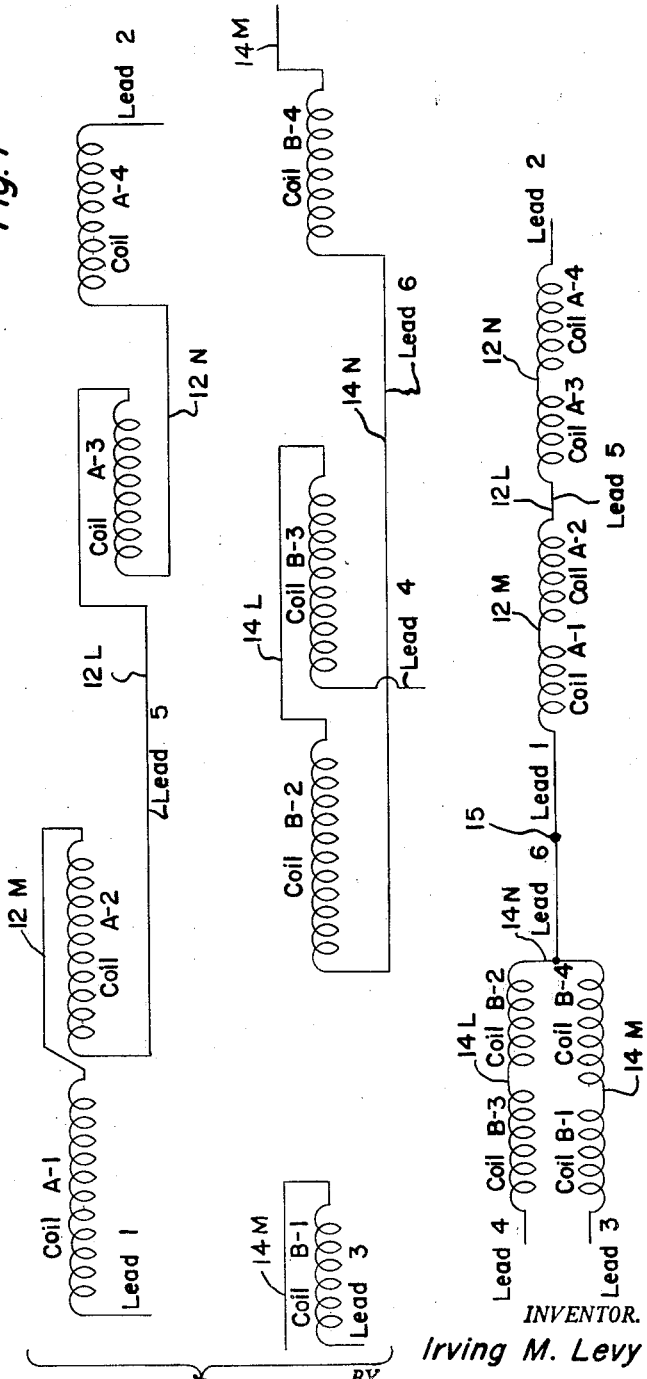
INVENTOR.
Irving M. Levy
BY Albert H. Reuther
His Attorney Sept. 12, 1961     I. M. LEVY     2,999,954
TWO-SPEED FOUR-SIX POLE STATOR WINDING ARRANGEMENT
Filed Sept. 29, 1959     2 Sheets-Sheet 2

INVENTOR.
Irving M. Levy
BY
His Attorney

United States Patent Office 2,999,954
Patented Sept. 12, 1961

2,999,954
TWO-SPEED FOUR-SIX POLE STATOR
WINDING ARRANGEMENT
Irving M. Levy, Dayton, Ohio, assignor to General Motors Corporation, Detroit, Mich., a corporation of Delaware
Filed Sept. 29, 1959, Ser. No. 843,211
5 Claims. (Cl. 310—166)

This invention relates to dynamoelectric machines and particularly to a stator winding for a capacitor start motor.

An object of this invention is to provide a new and improved stator winding arrangement for a dynamoelectric machine.

Another object of this invention is to provide a stator winding arrangement for four-six pole two speed single phase motor without a separate starting relay and having coils fitted into stator slots such that only one coil side per slot is necessary.

Another object of this invention is to provide a stator winding arrangement for a dynamoelectric machine having a slotted stator fitted with eight coils each spanning an equal number of slots though only one coil side per slot is necessary and adapted to be connected without a separate starting winding to start as a six pole motor having four wound and two consequent poles and to run on six pole connection under the same condition as well as adapted to be connected to run on four pole connection with the coils re-connected to give four wound poles.

Still a further object of this invention is to provide in one embodiment a dynamoelectric machine stator winding arrangement including thirty-two slots in a stator having two windings A and B each having four coil means including A-1, A-2, A-3, and A-4 as well as B-1, B-2, B-3, and B-4 with all four coils of winding A connected in series with each other and four coils of winding B in series with each other permanently such that various four and six pole connections can be obtained; for start and six pole run having four wound and two consequent poles as well as four pole run having four wound poles without a separate starting winding none of the coils thereof need be in shared slots.

Another object of this invention is to provide a dynamoelectric machine stator winding arrangement including thirty-two slots in a stator having two windings A and B having four coil means each including coil A-1 spanning slots 3-8, coil A-2 spannnig slots 9-14, coil A-3 spanning slots 19-24 and coil A-4 spanning slots 25-30 as well as coil B-1 spanning slots 1-6, coil B-2 spanning slots 11-16, coil B-3 spanning slots 17-22, and coil B-4 spanning slots 27-32, each coil including concentric sectors the opposite sides of which fit into individual slots such that none of the coils need be in shared slots with all four coils of winding A connected in series with each other for reverse polarity of a middle pair relative to an outer pair and coils B-1, B-2, B-3 and B-4 in series with each other permanantly such that the stator winding arrangement is connectible for a single phase two speed motor without a separate starting winding and adapted to start and run as a six pole motor having four wound and two consequent poles as well as to run on four pole connection of windings re-connected to give four wound poles.

Further objects and advantages of the present invention will be apparent from the following description, reference being had to the accompanying drawings wherein preferred embodiments of the present invention are clearly shown.

In the drawings:

FIGURE 1 is a developed view of a slotted stator and winding arrangement including coils of a pair of windings fitted thereto in accordance with the present invention.

FIGURE 1a is a schematic representation of two windings having coils and overlapped in relation to each other and having predetermined coils in series in accordance with the present invention.

FIGURE 2 is a schematic representation of connections of the coil groups of the above two windings.

Figure 4:
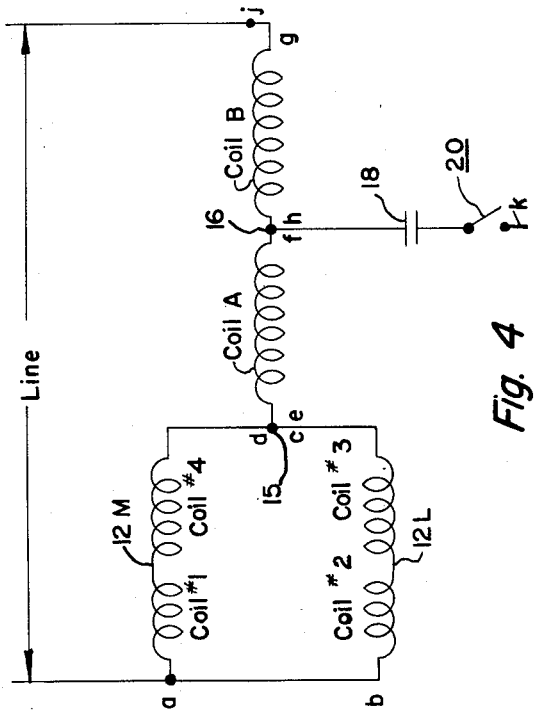
FIGURE 4 is a stator winding connection diagram for four pole running operation in accordance with the present invention.

FIGURE 1 illustrates a stator generally indicated by numeral 10 and including slots 10s separated from each other by teeth 10t in a developed view to facilitate understanding of a stator winding arrangement in accordance with the present invention. It is to be understood that the stator 10 is adapted to be fitted into an annular or suitable dynamoelectric machine frame that may have end covers provided with bearings for journalling a shaft that carries a rotor. The rotor can have a cast squirrel-cage winding formed in a well-known manner and the stator slots 10s extend toward the rotor. Slots 10s in the stator 10 are identified numerically by numerals 1 through 32 as indicated in FIGURE 1. A first winding generally indicated by numeral 12 and a second winding generally indicated by numeral 14 are fitted into predetermined slots for a winding arrangement in accordance with the present invention. Each of these two windings includes four wound coils or elements. One of the windings is fitted into bottom areas of predetermined slots prior to fitting of coils or elements of the other winding over the sides or ends of elements of the winding already fitted into predetermined slots.

The first winding 12 includes coils referred to individually with a reference numeral A followed by numerals to designate components thereof. All of the coils or elements of each of the windings may have ends or sides thereof in individual slots not shared by any other ends or sides of another coil or winding. All of the coils or elements span an equal number of predetermined slots. In the embodiment shown, having 32 slots in the stator, the first winding includes a coil A-1 having an inner concentric segment or sector A-1-a with opposite sides in slots 4 and 7 and an outer concentric sector or segment A-1-b with opposite sides fitted in slots 3 and 8. Coils A-2 includes an inner concentric sector or segments A-2-a with opposite sides in slots 10 and 13. Coil A-2 also includes an outer concentric sector or portion A-2-b with opposite sides in slots 9 and 14. Coil A-3 includes an inner concentric sector or segment A-3-a having opposite sides fitted into slots 20 and 23. Coil A-3 also has an outer concentric portion or sector A-3-b with opposite sides in slots 19 and 24. Coil A-4 includes an inner concentric segment or portion A-4-a having sides in slots 26 and 29 as well as an outer concentric portion or segment A-4-b having sides in slots 25 and 30.

The second winding 14 includes a coil B-1 having an inner concentric portion or segment B-1-a with opposite sides in slots 2 and 5. Coil B-1 also includes an outer concentric portion or segment B-1-b having opposite sides in slots 1 and 6. Coil B-2 includes an inner concentric member or segment B-2-a having opposite sides in slots 12 and 15 and an outer concentric member or segment B-2-b having opposite sides in slots 11 and 16. Coil B-3 includes an inner concentric portion or segment B-3-a having opposite sides in slots 18 and 21 and an outer concentric segment or portion B-3-b having opposite sides in slots 17 and 22. Coil B-4 includes an inner concentric portion or segment B-4-a having opposite sides in slots 28 and 31 and an outer concentric segment or portion B–4–*b* having sides in slots 27 and 32. It is noted that each of the thirty-two slots of stator 10 has a coil side fitted therein as outlined and only one coil side per slot is provided in accordance with the embodiment shown.

FIGURE 1*a* illustrates schematically permanent internal connections for the first and second windings relative to predetermined coils having overlapping relationship in part relative to each other. The view of FIGURE 1*a* is substantially in alignment with the view of FIGURE 1 so that positions of coils A–1, A–2, A–3, and A–4 relative to coils B–1, B–2, B–3, and B–4 is as indicated with description of FIGURE 1. Coils A–1 and A–2 are wound for opposite polarity and are interconnected by a lead 12M. Coil A–3 is wound to have the same polarity as that of coil A–2 and coil A–4 is wound to have the same polarity as coil A–1. Ends of coils A–3 and A–4 are interconnected by a lead 12N. A tap-in connection identified as lead number 5 is provided at lead 12L and free ends of coils A–1 and A–4 have leads number 1 and number 2 respectively. Thus, the four coils of the first winding are connected in series relative to each other to form part of a final internal connection where lead number 1 is connected to lead number 6 at a junction 15.

Lead number 6 is a tap-in connection at lead 14N which connects coil B–4 to coil B–2. Coils B–2 and B–3 are interconnected by a lead 14L. As best seen in FIGURE 2, coils B–3 and B–2 are wound for opposite polarity. As best seen in FIGURE 2, coils B–1 and B–4 also are wound to have opposite polarity such that polarity of coil B–1 is the same as that of coil B–3 and polarity of coil B–4 is the same as that of coil B–2. Coils B–1 and B–4 are interconnected by lead 14M. Leads 3 and 4 are brought out from ends of coils B–1 and B–3, respectively.

Figure 3:
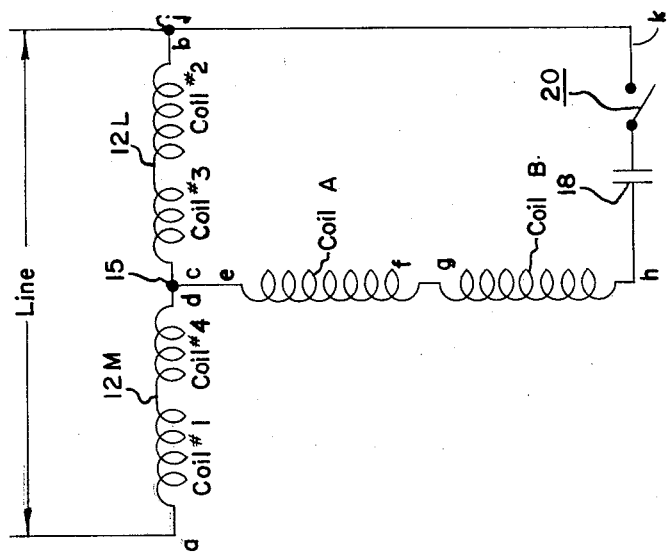
FIGURE 3 is a stator winding connection diagram for starting and six pole running operation in accordance with the present invention.

In FIGURE 3, there is shown a stator winding connection diagram for starting and running operations utilizing six poles by having four wound and two consequent poles obtained by connection of coils of the first and second windings relative to a source of power applied to leads number 3 and number 4 as indicated. A rotor R is shown in the view of FIGURE 3 and it is noted that the elements or coils of the first and second windings represented diagrammatically in FIGURE 3 have sides placed in predetermined slots as described with the illustration of FIGURE 1. The permanent connections of the first and second windings each including four coils is as shown in FIGURE 2. When connected for six pole starting and running operation lead number 5 is not in the circuit. A phase shifting means such as a capacitance 16 is connected on one side to lead number 2 and on an opposite side in series with a switching means generally indicated by numeral 18 relative to a common juncture of the lead number 4 and a connection to one side of the line. It is to be understood that phase shift can be obtained by other than a capacitance which is optional and the switching means or relay 18 involves structure per se that does not form part of the present invention. An example of such switching means appears in Patent 2,242,769, Werner or in Patent 2,747,854, Schnepf, issued May 29, 1956, and assigned to the assignee of the present invention. Any suitable switching or relay means can be used. In the connection diagram of FIGURE 3, the first winding 12 including coils A–1, A–2, A–3 and A–4 in series together with the phase shift means 16 and switching means 18 in series are in parallel relative to coils B–3 and B–2 permanently in series due to connection by lead 14L. The series parallel connected coils of the first winding and coils B–2 and B–3 of the second winding are all in series with coils B–1 and B–4 of the second winding 14. Starting and running operation as a six pole motor having four wound and two consequent poles results from the connection of coils of the first and second windings as shown in FIGURE 3. The switching means 18 remains closed only during starting operation until a predetermined speed is attained in response to which the switching means opens to disconnect the phase shift means 16 from the circuit. In this way both starting and running can be obtained utilizing four wound poles and two consequent poles.

In FIGURE 4 there is illustrated a stator winding connection diagram for four pole running operation obtained by supplying line voltage from a suitable source relative to connections to leads 3 and 4 in a common juncture on one side and line or lead 5 on an opposite side. A juncture 20 is formed by common connection of leads number 1, 2, and 6. Thus, coils B–3 and B–2 in series as a group are connected in parallel with another group including coils B–1 and B–4 in series. Similarly, coil A–4 and coil A–3 in series as a group are in parallel with another group including coils A–1 and A–2 in series. Series-parallel connected coils of the first and second windings are in series with each other to provide four wound poles for four pole operation. Suitable manual or speed responsive switches can be used to attain the specific connection shown in FIGURE 4. The coils of first and second windings all form a stator winding for one motor that can always be started on six pole connection. A change to four pole running operation is accomplished by either manual or automatic switching means. Any suitable switching means per se in a circuit for changing between four and six pole operation can be provided by anyone skilled in the art and forms no part of the present invention. This switching means necessarily connects lead 5 to line and lead 2 is switched to juncture 20 as represented in FIGURE 4. Leads 3 and 4 are likewise joined to line for four pole operation as shown in FIGURE 4.

While the embodiments of the present invention as herein disclosed constitute preferred forms, it is to be understood that other forms might be adopted.

What is claimed is as follows:

1. A dynamoelectric machine stator winding arrangement, comprising, a stator having a total of thirty-two slots numbered arbitrarily 1 through 32, a first winding including a first coil having concentric segments spanning slots 3–8, 4–7, a second coil having concentric segments spanning slots 9–4, 10–13, a third coil having concentric segments spanning slots 19–24, 20–23, as well as a fourth coil having concentric segments spanning slots 25–30, 26–29 respectively, a second winding including a first coil having concentric segments spanning slots 1–6, 2–5, a second coil having concentric segments spanning slots 11–16, 12–15, a third coil having concentric segments spanning slots 17–22, 18–21, as well as a fourth coil having concentric segments spanning slots 27–32, 28–31 respectively, means connecting said first four coils together in pairs in a sequence of alternate polarity, said second four coils being wound and interconnected together in pairs in a sequence of alternate polarity, all of said elements of both first and second windings having only one coil side per slot and having overlapping relation such that one coil side of each of said elements of one winding is centrally located relative to elements of the other winding.

2. A dynamoelectric machine stator winding circuit arrangement, comprising, a stator having a predetermined number of slots therein, a first winding having four coil elements with opposite sides in slots and spanning a predetermined number of slots, means connecting said first four elements together in pairs in a sequence of alternate polarity, a second winding having four coil elements with opposite sides in slots and having substantially the same span as those of the first winding, said second winding having elements connected together in pairs in a sequence of alternate polarity and having lead three from one end of a first coil element, lead four from one end of a third coil element and lead six from an interconnection of ends of second and fourth elements, a phase shifting means as well as switching means therefor in series with said four coil elements of said first winding forming a six pole circuit having four wound and two consequent poles for starting operation with phase shift and running operation without phase shift, and a connection to line voltage from a source of power provided relative to leads three and four for six pole operation and to leads four and five for four pole operation obtained having four wound poles due to connection of lead two to lead one and connection of lead three to lead four so as to parallel two elements of each winding with two other elements of the winding, said paralleled elements of first and second windings having a series connection for four pole operation, said elements of said second winding having partial overlapping relation relative to elements of said first winding though only one coil side per slot is necessary.

3. The circuit arrangement of claim 2 wherein the stator includes thirty-two slots and said second winding is fitted into said slots relative to which said first winding is fitted thereover such that sides of said elements of said first winding are centrally located relative to elements of said second winding, elements of said first winding spanning slots 3–8, 9–14, 19–24, as well as 25–30 respectively and elements of said second winding spanning slots 1–6, 11–16, 17–22 as well as 27–32.

4. The circuit arrangement of claim 2 wherein said phase shifting means is a capacitor connected in series with said first winding for six pole starting operation and the switching means has normally closed contacts until a predetermined speed is attained where contacts are opened to disconnect the capacitance and the first winding for four pole running, said circuit arrangement for six pole running operation using both said first and second windings relative to each other with only said capacitance disconnected from the circuit.

5. A dynamoelectric machine stator winding circuit arrangement, comprising, a stator having a total of thirty-two slots, a first winding including four elements spanning slots 3–8, 9–14, 19–24 and 25–30 respectively, means connecting said first four elements connected together in pairs in a sequence of alternating polarity, a second winding also including four elements spanning slots 1–6, 11–16, 17–22 and 27–32 respectively, said second four elements having coils connected together in pairs in a sequence of alternate polarity, leads one and two brought out from slots three and thirty of said first winding elements, leads three and four brought out from slots one and thirty, leads five and six brought out as tap-in connections relative to a pair of series interconnections between pairs of elements of said first and second windings respectively, a phase shifting means as well as switching means therefor in series with said four elements of said first winding parallel relative to part of said second winding to provide a six pole circuit having four wound and two consequent poles for starting operation with phase shift and running operation without phase shift, and a connection to line voltage from a source of power provided relative to leads three and four for six pole operation and to leads four and five for four pole operation obtained having four wound poles due to connection of leads one, two and six in a central common juncture and connection of lead three to lead four so as to parallel two elements of each winding with two other elements of the same winding, said parallel elements of first and second windings having a series connection through the common juncture for four pole operation, said elements of said second winding having partial overlapping relation relative to elements of said first winding though only one side of each element is placed in each slot, none of the sides of elements having to share a slot with any other element.

References Cited in the file of this patent

UNITED STATES PATENTS 2,671,879     Schwarz _____ Mar. 9, 1954

FOREIGN PATENTS 450,515     Canada _____ Aug. 17, 1948